United States Patent
Hasegawa

(10) Patent No.: US 6,618,441 B1
(45) Date of Patent: Sep. 9, 2003

(54) MOTION VECTOR DETECTION APPARATUS

(75) Inventor: Satoshi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/708,515

(22) Filed: Nov. 9, 2000

(30) Foreign Application Priority Data

Nov. 11, 1999 (JP) .......................................... 11-320487

(51) Int. Cl.⁷ ................................................ H04N 7/12
(52) U.S. Cl. .................................. 375/240.16; 348/699
(58) Field of Search ............. 375/240.16; 348/699–700, 348/416.1; 386/111; 382/236, 238; 358/261.2, 430

(56) References Cited

U.S. PATENT DOCUMENTS

| 5,721,595 A | * | 2/1998 | Chen et al. .................. 348/699 |
| 6,320,906 B1 | * | 11/2001 | Toyokura et al. ...... 375/240.16 |
| 6,424,676 B1 | * | 7/2002 | Kono et al. ............ 375/240.16 |

FOREIGN PATENT DOCUMENTS

| JP | 5-336432 | 12/1993 | .......... H04N/5/232 |
| JP | 8-32969 | 2/1996 | ............ H04N/7/32 |
| JP | 9-130811 | 5/1997 | ............ H04N/7/32 |
| JP | 9-266573 | 10/1997 | ............ H04N/7/32 |
| JP | 10-136373 | 5/1998 | ............ H04N/7/32 |
| JP | 10-191352 | 7/1998 | ............ H04N/7/32 |

* cited by examiner

Primary Examiner—Vu Le
(74) Attorney, Agent, or Firm—Whitham, Curtis & Christofferson, P.C.

(57) ABSTRACT

An object of the present invention is to implement a motion vector detection apparatus capable of drastically shortening the processing time required for detection of a motion vector between frames. When deriving a motion vector of an image portion of a specific macro block obtained by dividing a frame between frames of a dynamic image, vector evaluation values of macro blocks located around the specific macro block in a frame currently under processing are acquired, and a minimum value among them is set as a fixed detection threshold value. If an inspection framework which becomes at most the fixed detection threshold value emerges in a stage for scanning the inside of the retrieval range in a reference frame with the inspection framework and deriving a vector evaluation value, then retrieval is not conducted thereafter.

6 Claims, 11 Drawing Sheets

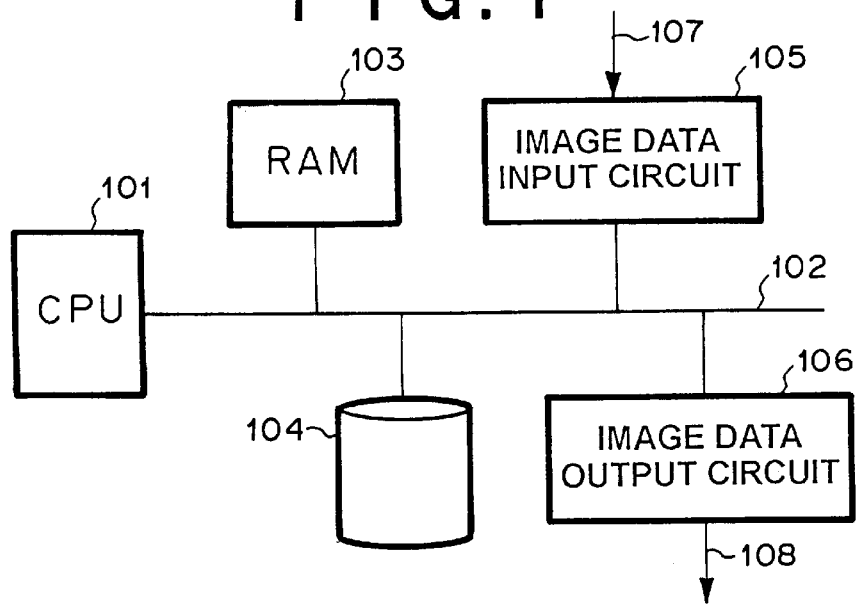
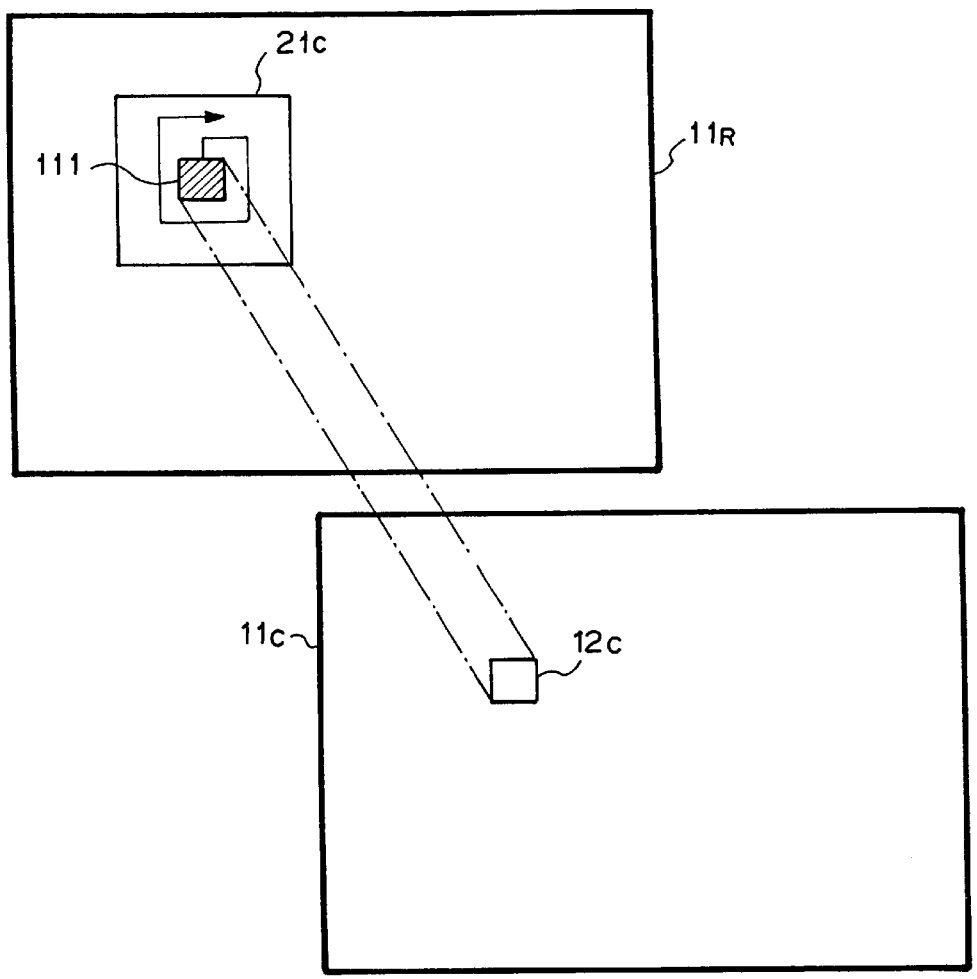

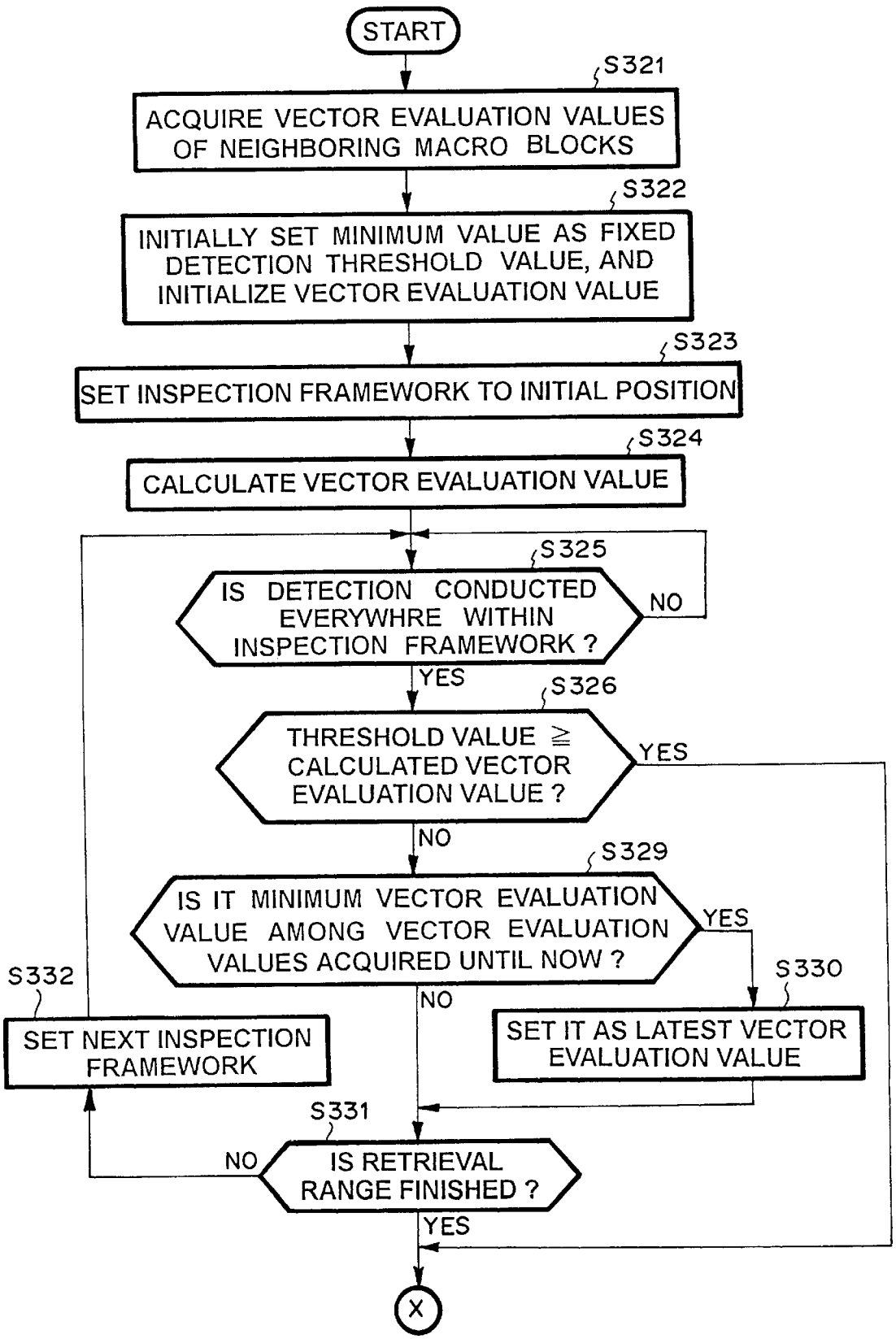

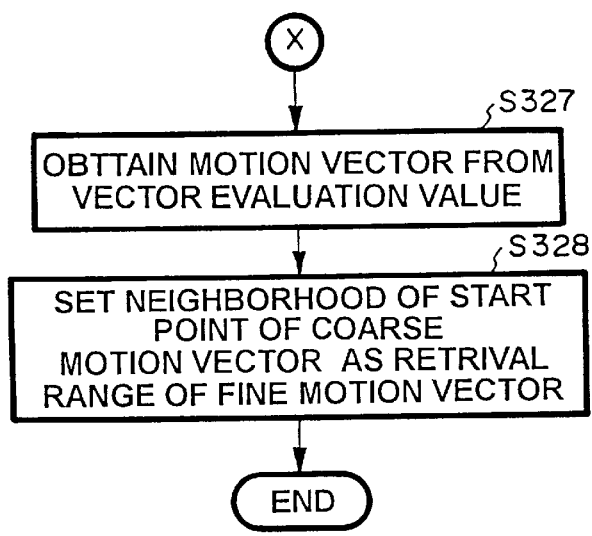
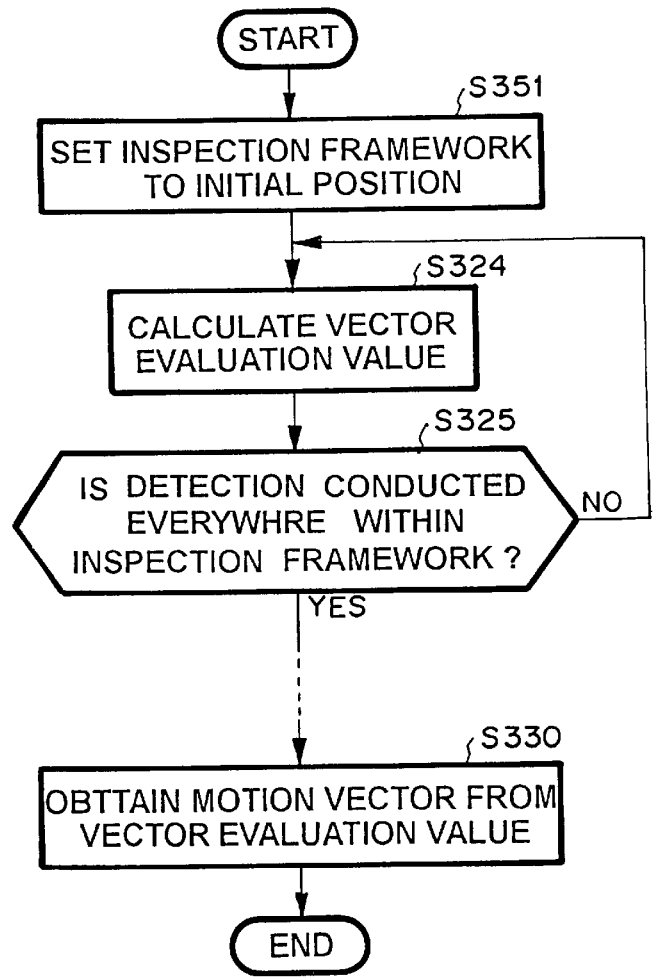

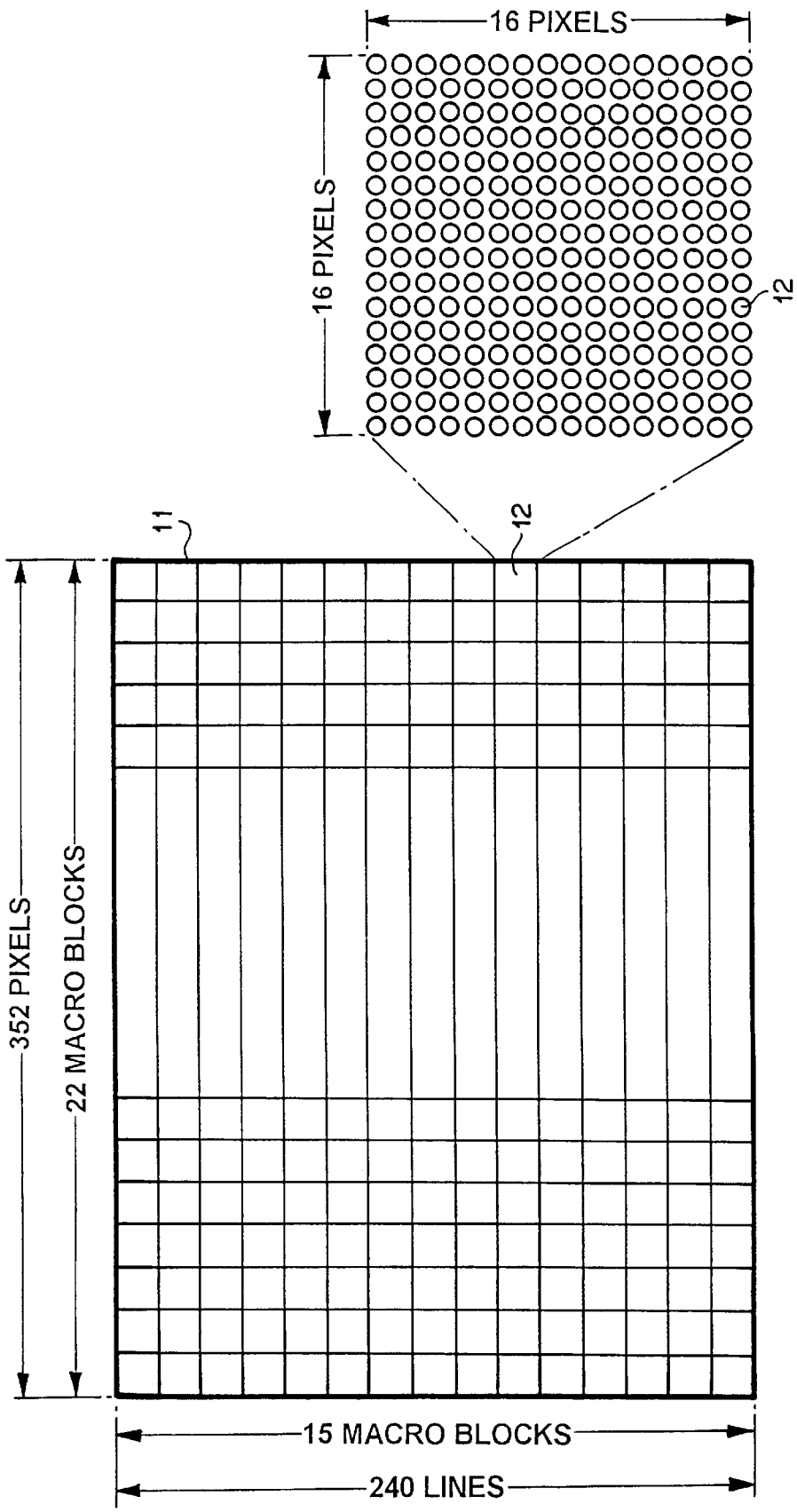

MOTION VECTOR DETECTION APPARATUS

BACKGROUND OF THE INVENTION

1. Technical Field of the Invention

The present invention relates to a motion vector detection apparatus to be used in an apparatus for encoding dynamic images. In particular, the present invention relates to a motion vector detection apparatus for detecting a motion vector representing the movement direction and movement quantity of a dynamic image signal between dynamic image frames.

2. Description of the Prior Art

With development of computers and communication networks, digital processing of video signals is rapidly spread. For example, dynamic images are distributed to homes by using a communication satellite, and utilization of the digital image technique using the digital movie, DVD (digital versatile disc), or the like is spread rapidly.

Implementation of faster communication networks for transmitting image data greatly contributes to development of such a technique. Together therewith, advancement of an image compression technique such as the MPEG (moving picture experts group: ISO) cannot be overlooked. For example, in the MPEG, there is detected a motion vector indicating a position in the next frame to which an image included in a certain frame has moved, in order to compress a dynamic image between frames. As for an image part which does not move in successive frames, a previously detected image is used as it is. As for an image part having a motion between frames, such signal processing as to shift the image part by using a detected motion vector is conducted to increase the compression factor of the image. Under such circumstances, a technique for detecting motion vectors is attracting attention.

FIG. 12 shows an example of a relation between a frame and a macro block used in motion vector detection. In FIG. 12, a rectangle surrounded by an outer frame represents a frame 11 displayed on the screen at a certain time. In this example, the frame 11 is formed of 352 pixels by 240 lines. The frame 11 is divided into macro blocks 12 each formed of a rectangular region having 16 pixels by 16 pixels. In this case, the frame 11 is formed of 22×15 macro blocks 12. Each macro block 12 becomes the unit of motion vector detection.

The reason why a region of some pixels is thus defined as the macro block 12 is that a region of such a degree that it can be recognized as a pattern of a certain degree is needed in order to judge the motion of the image within the framework. If the size of the macro block 12 is expanded more than needed, then there occur problems such as a problem that a region which is stationary between frames cannot be pick out efficiently. Furthermore, as the size of the macro block is made smaller, the quantity of information for comparison decreases and the data quantity of whole processing for detecting a motion vector increases. Under such circumstances, the macro block size becomes in many cases equal to approximately the above described pixel size.

FIG. 13 is a diagram showing the concept of the motion vector. It is now assumed that there are a first frame $11_1$ and a second frame $11_2$ which is temporally later than the first frame $11_1$, on a time axis (t). It is assumed that a dynamic image corresponding to an arbitrary macro block $12_1$ shaded in the first frame $11_1$ is judged to have moved from the same position 14 in the frame to a different position 15 in the second frame $11_2$ obtained after the elapse of a predetermined time. In this case, a motion vector 16 can be represented as a connection of the position 14 before the movement to the position 15 after the movement in the same frame $11_2$.

FIG. 14 shows the principle of detecting such a motion vector. In the same way as the description given by referring to FIG. 13, it is now assumed that there are a first frame $11_1$ and a second frame $11_2$ which is temporally later than the first frame $11_1$. The second frame $11_2$ is a picture which is now being subjected to processing for detecting a motion vector. The first frame $11_1$ is a picture for which processing has already been finished. As for a macro block $12_2$ in the position 15 of the second frame $11_2$ for which a motion vector is to be detected, retrieval is effected to find a position of the first frame $11_1$ having a macro block which resembles the macro block $12_2$ most closely and thereby the motion vector is detected.

At this time, a concept referred to as a retrieval range 21 is introduced in order to reduce the burden of the search processing. Only in the retrieval range 21, a macro block of a dynamic image corresponding to the macro block $12_2$ is detected. This detection operation is conducted by scanning the image pattern in the same range as that of the macro block $12_2$ as in TV raster scan, beginning from the left top corner and successively in the retrieval range 21. A scan position which has caused the highest coincidence becomes a start point of the motion vector. For the purpose of calculation processing for judging the start point of the motion vector, a concept called vector evaluation value is introduced in some cases.

FIG. 15 is a diagram showing the concept of the vector evaluation value so as to correspond to FIG. 14. In the retrieval range 21 shown in FIG. 14, an inspection framework $31_1$ having the same size as that of the macro block $12_2$ is disposed. And absolute values of differences respectively between 16 by 16 pixels included in the inspection framework $31_1$ (see a right bottom part of FIG. 12) and 16 by 16 pixels forming the macro block $12_2$ are derived, and they are added together. A resultant sum $\Sigma E_1$ is adopted as the vector evaluation value for the inspection framework $31_1$. The reason why absolute values are derived is that the difference of signal levels of pixels is to be found. If the inspection framework $31_1$ completely corresponds to the macro block $12_2$, then ideally the vector evaluation value $\Sigma E_1$ becomes "0."

If the vector evaluation value $\Sigma E_1$ between the inspection framework $31_1$ and the macro block $12_2$ is thus derived, then an inspection framework $31_2$ obtained by moving the inspection framework $31_1$ in a direction of an arrow 32 shown in FIG. 15 by one pixel is disposed in the same way. Between the inspection framework $31_2$ and the macro block $12_2$, absolute values of differences respectively of 16 by 16 pixels are derived. The absolute values are added. A resultant vector evaluation value is $\Sigma E_2$. Then an inspection framework $31_3$ obtained by further moving the inspection framework $31_2$ in a direction of the arrow 32 by one pixel is disposed in the same way. Between the inspection framework $31_3$ and the macro block $12_2$, absolute values of differences respectively of 16 by 16 pixels are derived. The absolute values are added. A resultant vector evaluation value is $\Sigma E_3$. Hereafter, all regions in the retrieval range 21 as described with reference to FIG. 14 are thus scanned in the same way. Respective vector evaluation values $\Sigma E$ are thus derived. It is understood that such a position of the framework 31 in the retrieval range 21 that the sum of absolute values becomes minimum is a position which has become the start point of movement of the macro block $12_2$. By thus calculating the vector evaluation value in every position in the retrieval range 21, comparing them with each other, and finding an inspection framework 31 having a minimum value, a motion vector in the position of the macro block $12_2$ can be derived.

With respect to each position of macro blocks 12 of the current frame (the second frame $11_2$), a vector evaluation value having a minimum value between the macro block 12 and a past frame to be referred to (the first frame $11_1$), in the retrieval range 21 is thus derived. By doing so, a motion vector in each position of the macro block 12 of the current frame ((the second frame $11_2$) can be derived. For that purpose, however, massive calculation needs to be conducted between frames. This is evident even if the consideration is limited to the macro block $12_2$ in the position 15 shown in FIG. 14. In other words, while successively shifting the inspection framework 31 shown in FIG. 15 by one pixel in the horizontal direction, beginning from the top left end, work for deriving the vector evaluation value ΣE each time is effected. In addition, the inspection framework 31 is moved to a position which is shifted from the top left end downward by one pixel. While successively shifting the inspection framework 31 by one pixel in the horizontal direction, the vector evaluation value ΣE is derived each time in the same way. Such calculation processing is repeated meanderingly by the number of pixels in the vertical direction forming the inspection framework 31.

Even if the communication rate of the transmission path is increased or the image recording rate is increased in order to make the dynamic image communication possible, therefore, a very long time is required for image processing, resulting in a problem of occurrence of a fault in real time processing.

Therefore, various measures for reducing the burden of the motion vector processing have heretofore been proposed and put to practical use.

For example, in JP 8-32969 A (1996), there is provided retrieval range control means for adaptively selecting controlling the size of the motion vector retrieval range 21 in a frame to be referred to (the first frame $11_1$) corresponding to the macro block to be processed. The retrieval range control means contracts the retrieval range 21 as the correlation of the motion vector position becomes higher. For an image region which is small in motion change, the retrieval range control means makes the retrieval region smaller. Thus the retrieval range control means shortens the processing time for detecting the motion vector. For an image region which is large in motion change, the retrieval range control means expands the retrieval range 21 and conducts accurate motion detection. In this way, accurate motion vector retrieval and faster processing speed are implemented efficiently.

Furthermore, in JP 10-191352 A (1998), it is attempted to improve the processing in two points. A first point is to make the processing speed faster. In the technique shown in the publication, computation of each vector evaluation value for motion vector detection as described with reference to FIG. 15 is conducted by deriving accumulation results in parallel by using accumulation addition circuits connected in parallel in a pipeline form.

A second point is to reduce the burden of the above described computation processing of the vector evaluation value. In the technique shown in JP 10-191352 A (1998), accumulation addition cease means is used in processing for deriving an accumulation addition value of absolute values of respective differences between pixels forming the macro blocks 12 in respective positions of the current frame (the second frame $11_2$) and pixels of the inspection framework 31 of the past frame to be referred to (the first frame $11_1$). When, in the process of deriving the accumulation addition value, the value has exceeded a predetermined threshold value, the accumulation addition cease means stops the accumulation and addition operation. By thus suspending useless computation processing in such an inspection framework 31 as not to become the detection subject of the motion vector, the accumulation addition cease means attempts to decrease the computer processing. The accumulation addition cease means will now be described more concretely.

FIG. 16 shows the principle of the motion vector detection processing using the accumulation addition cease means of this proposal. Processing similar to this is disclosed in JP 10-136373 A (1998) as well. First, in retrieving the position serving as the start point of the motion vector in the retrieval range 21 shown in FIG. 14, the minimum value of the accumulation addition value is initialized (step S41). The start point of the motion vector must be the minimum value of the accumulation addition value serving as the vector evaluation value. Since the retrieval is in its initial stage, however, a maximum value that the final accumulation addition value can take is set as the initial value for initialization. Subsequently, as the initial value of the inspection framework 31 (see FIG. 15), for example, the top left corner in the retrieval range 21 is set (step S42). The inspection framework 31 is set in this position (step S43). While deriving absolute values of differences between the inspection framework 31 and a macro block serving as a tip point of the motion vector (macro block $12_2$ in the position 15 in FIG. 14) by taking a pixel as the unit, they are successively added (step S44). At the time of this addition, it is determined whether the current accumulation value thus obtained has become greater than a minimum accumulation value (step S45). If the minimum accumulation value is not reached (N) and the calculation of the vector evaluation value is not yet finished (N of step S46), then the processing returns to the step S44, and the accumulation operation of the vector evaluation value further advances.

On the other hand, if the value is smaller than the minimum accumulation value even when the calculation of the vector evaluation value with respect to the inspection framework 31 has been finished (Y of step S46), then the minimum accumulation value set until now is replaced with the value of the vector evaluation value which has now been finished (step S47). If calculation of the vector evaluation value in all positions in the retrieval range 21 is not finished (N of step S48), then a position in which the inspection framework 31 should be set subsequently is set as a "predetermined position" for calculation (step S49). The processing returns to the step S43, and the work for deriving the vector evaluation value with respect to the next inspection framework 31 is started.

While thus moving the position of the inspection framework 31 in the retrieval range 21, the vector evaluation value is successively calculated. If the accumulation value of the vector evaluation value with respect to the inspection framework 31 during this process exceeds the minimum accumulation value at the time, then the accumulation computation is finished at that time point, and the position of the inspection framework 31 is moved to the next position. If the calculation of the vector evaluation value in all positions in the retrieval range 21 is finally finished (Y of step S48), then the position of the inspection framework 31 having a vector evaluation value corresponding to the current minimum accumulation value is set as the start point of the motion vector (step S50).

Heretofore, proposals for improving the processing for calculating the motion vector have been described. Even if these proposals are adopted, there is no change in that the burden of the encoding processing is considerably heavy. For example, it is now assumed that the processing shown in FIG. 16 is executed and the minimum accumulation value finally becomes a value R. Until this value is reached, however, it is necessary to continue the computation of the accumulation value with respect to individual inspection frameworks 31 even for values greater than R. Furthermore, even if the value R is found in a comparatively early stage, it is necessary to move the inspection framework 31 to all positions in the retrieval range 21 by taking a pixel as the unit and continue the computation of the accumulation value for each of them until the value R is reached.

If it is attempted to execute an image compression technique such as MPEG in a simple processing apparatus such as a personal computer or a small sized information processing terminal in real time, therefore, the case where the encoding processing rate per frame exceeds the frame interval still occurs. This results in a problem that smoothly moving dynamic image communication and dynamic image recording are hampered in many cases.

SUMMARY OF THE INVENTION

Therefore, an object of the present invention is to provide a motion vector detection apparatus capable of drastically shortening the processing time required for detection of the motion vector.

In the present invention, a vector evaluation value is derived while successively moving an inspection framework within a retrieval range, when detecting a motion vector. In this process, a fixed detection threshold value is set in a macro block included in the frame under processing and already finished in motion vector detection processing, on the basis of its vector evaluation value. If a vector evaluation value less than the fixed detection threshold value emerges in comparison, then a motion vector is judged to have been detected in that stage. As a result, subsequent retrieval processing for the macro block for which a motion vector is to be detected becomes unnecessary, resulting in faster processing. When the macro block specifying means has specified one macro block, vector evaluation values might be already derived for some macro blocks among a predetermined number of macro blocks located near the macro block in the same frame under processing and having specific position relations to the macro block. In this case, the fixed detection threshold value is set on the basis of those values. The reason why values of the motion vector of macro blocks located in the vicinity are referred to is that the macro blocks and the macro block for which the motion vector is to be derived typically have very intense correlation in motion of the dynamic image portion.

Further, in the present invention, the fixed detection threshold value setting means sets a fixed detection threshold value out of vector evaluation values of a predetermined number of macro blocks having specific position relations. Thereby, the fixed detection threshold value setting means makes the condition for judging the motion vector strict, and raises the reliability of the motion vector in the case where a vector evaluation value less than the fixed detection threshold value is obtained.

Further, in the present invention, it is taken into consideration that the motion vector detection apparatus finishes the processing when a vector evaluation value which is at most the fixed detection threshold value, and a contrivance is made in order to make the vector evaluation value which is at most the fixed detection threshold value as soon as possible. When setting a retrieval range for a macro block which is included in the frame under processing, the prediction means predicts a motion of a dynamic image portion by referring to a motion vector of a frame already finished in processing and included in an image portion corresponding to the macro block, for example by referring to a past motion vector according to the processing method. The retrieval range setting means sets a retrieval range in order that the position predicted by the prediction means may become its central position. As a result, calculation of the vector evaluation value can be conducted in a range having high likelihood and in an order having high likelihood.

Further, in the present invention, coarse motion vector retrieval processing is first conducted and tentative motion vector detection is conducted in a predetermined retrieval range. On the basis of the result, the range for conducting fine motion vector retrieval processing is narrowed. With respect to the narrowed range, fine motion vector retrieval is conducted. Thereby efficiency of the retrieval is increased. In addition, a technical thought of retrieval discontinuance using the fixed detection threshold value is applied to such a retrieval technique in order to shorten the processing time.

Further, in the present invention, the retrieval range is not merely scanned simply as in the raster scan of TV. The inspection framework is moved from a central portion having high likelihood to a peripheral part so as to be able to detect a vector evaluation value which is at most the fixed detection threshold value as soon as possible. The processing time is thus shortened.

Further, in the present invention, if a value better than expected is obtained as a vector evaluation value in the process of the coarse motion vector retrieval scanning, then a motion vector can be set on the basis of the position without conducting fine motion vector retrieval scanning, in order to shorten the processing time. As a matter of course, in such a situation that time shortening is demanded very severely, it is also possible to conduct only the coarse motion vector retrieval scanning and detect the motion vector from only the result.

According to the present invention, a vector evaluation value is derived while successively moving an inspection framework within a retrieval range, when detecting a motion vector. In this process, a fixed detection threshold value is set in a macro block included in the frame under processing and already finished in motion vector detection processing, on the basis of its vector evaluation value. If a vector evaluation value less than the fixed detection threshold value emerges in comparison, then a motion vector is judged to have been detected in that stage. As a result, subsequent retrieval processing for the macro block for which a motion vector is to be detected becomes unnecessary, resulting in faster processing.

Further, according to the present invention, the fixed detection threshold value setting means sets a fixed detection threshold value out of vector evaluation values of a predetermined number of macro blocks having specific position relations. By utilizing the correlation to motion vectors of macro blocks in the neighborhood, therefore, detection of a motion vector having high likelihood can be made possible.

Further, according to the present invention, when setting a retrieval range for a macro block which is included in the frame under processing and for which the motion vector detection means is to derive a motion vector, the retrieval range setting means predicts a position of existence of a pixel portion corresponding to the macro block in the reference frame, by referring to a motion vector of a macro block having the same position as the above described macro block in a frame already finished in processing, and sets a retrieval range in order that the position may become its central position. Even if the retrieval range is a relatively narrow range, therefore, a motion vector can be favorably detected. Furthermore, since the central position of the retrieval range is set to a predicted position, the motion vector can be detected at high speed.

Further, according to the present invention, the inspection framework moving means includes first inspection framework moving means for moving an inspection framework coarsely in the retrieval range and second inspection framework moving means for moving an inspection framework finely in the retrieval range. Rough detection of the motion vector can be conducted by using the first inspection framework moving means. In such a case that tendency of the motion vector is hard to judge, the invention is effective. Furthermore, since the retrieval range of the second inspection framework moving means can be limited, it is possible to reconcile the detection precision and the processing time. Furthermore, since the invention of claim 4 applies the invention of claim 1, the processing time can be shortened for both the detection of the coarse motion vector and the fine motion vector. As a result, total processing time can be shortened.

Further, according to the present invention, the inspection framework moving means successively moves an inspection framework from a central portion of the retrieval range to a peripheral part. In such a general case that a central portion has high likelihood, therefore, it becomes possible to find a vector evaluation value which is at most the fixed detection threshold value earlier. In the case where such a technique that the processing is finished at the time of finding is adopted, shortening of the processing time can be implemented.

Further, according to the present invention, when a vector evaluation value of a motion vector judged by the motion vector detection decision means in the motion vector detection apparatus by using the first motion vector detection means is less than the fixed detection threshold value, the judged motion vector is set as a fixed motion vector without conducting final detection of a motion vector using the second motion vector detection means. After conducting only the process of the coarse retrieval scanning, detection of the motion vector can be finished, contributing to greatly the processing time shortening.

BRIEF EXPLANATION OF THE DRAWINGS

FIG. 1 is a block diagram showing the outline of a motion detection apparatus in a first embodiment of the present invention.

FIG. 2 is an explanatory diagram showing the principle of detection of a motion vector in the present embodiment.

FIG. 9 is a flowchart showing a former half of a concrete flow of coarse motion vector retrieval processing shown in step S301 of FIG. 8.

FIG. 10 is a flowchart showing a latter half of a concrete flow of coarse motion vector retrieval processing shown in step S301 of FIG. 8.

FIG. 11 is a flowchart showing a concrete flow of fine motion vector retrieval processing described with reference to step S302 of FIG. 8.

FIG. 12 is an explanatory diagram showing an example of the relation between a frame and macro blocks used when detecting a motion vector.

PREFERRED EMBODIMENT OF THE INVENTION

Figure 3:
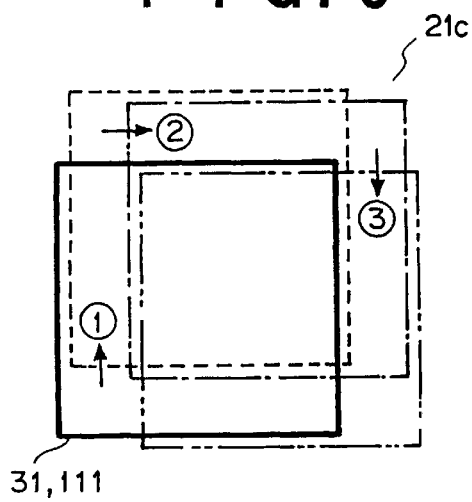
FIG. 3 is an explanatory diagram showing a part of movement of an inspection framework in the present embodiment.

Hereafter, the present invention will be described in detail by referring to embodiments.

(First Embodiment)

FIG. 1 shows an outline of a motion vector detection apparatus in a first embodiment of the present invention. The motion vector detection apparatus has a configuration similar to the central part of a personal computer. The motion vector detection apparatus has a CPU (central processing unit) 101. The CPU 101 is connected to a RAM 103, a storage device 104, an image data input circuit 105, and an image data output circuit 106 included in the apparatus via a bus 102 such as a data bus.

The RAM 103 is a random access memory for working. The storage device 104 is formed of, for example, a magnetic disk. In a storage region of a part of the storage device 104, a program for making the motion vector detection apparatus perform its function is stored. When the apparatus is started, the program is written into a predetermined region of the RAM 103. Execution of the program conducted by the CPU 101 causes encoding processing of image data. The image data input circuit 105 is a circuit for inputting image data 107 to be subjected to encoding processing with MPEG. Inputting the image data 107 may be conducted from a telephone line or a network, or may be conducted from a storage medium such as an optical disk which is not illustrated. Image data inputted from the same image pick up device such as a TV camera which is not illustrated as a temporally continuous dynamic image can be stored in a predetermined region of the RAM 103, or can be stored in a region of the storage device 104 for storing image data prior to the processing. Of course, the dynamic image can also be obtained by using a technique such as animation instead of such an image pick up device. The image data output circuit 106 is a circuit for outputting an image data 108 after encoding to the outside. The image data before outputting can be stored in the RAM 103, or can be stored in a region of the storage device 104 for storing the image data after processing.

By the way, the image data 107 to be inputted to the image data input circuit 105 has a frame structure shown in FIG. 12. In other words, the frame 11 is formed of 352 pixels by 240 lines. The frame 11 is divided into macro blocks 12 each formed of a rectangular region having 16 pixels by 16 pixels.

Figure 14:
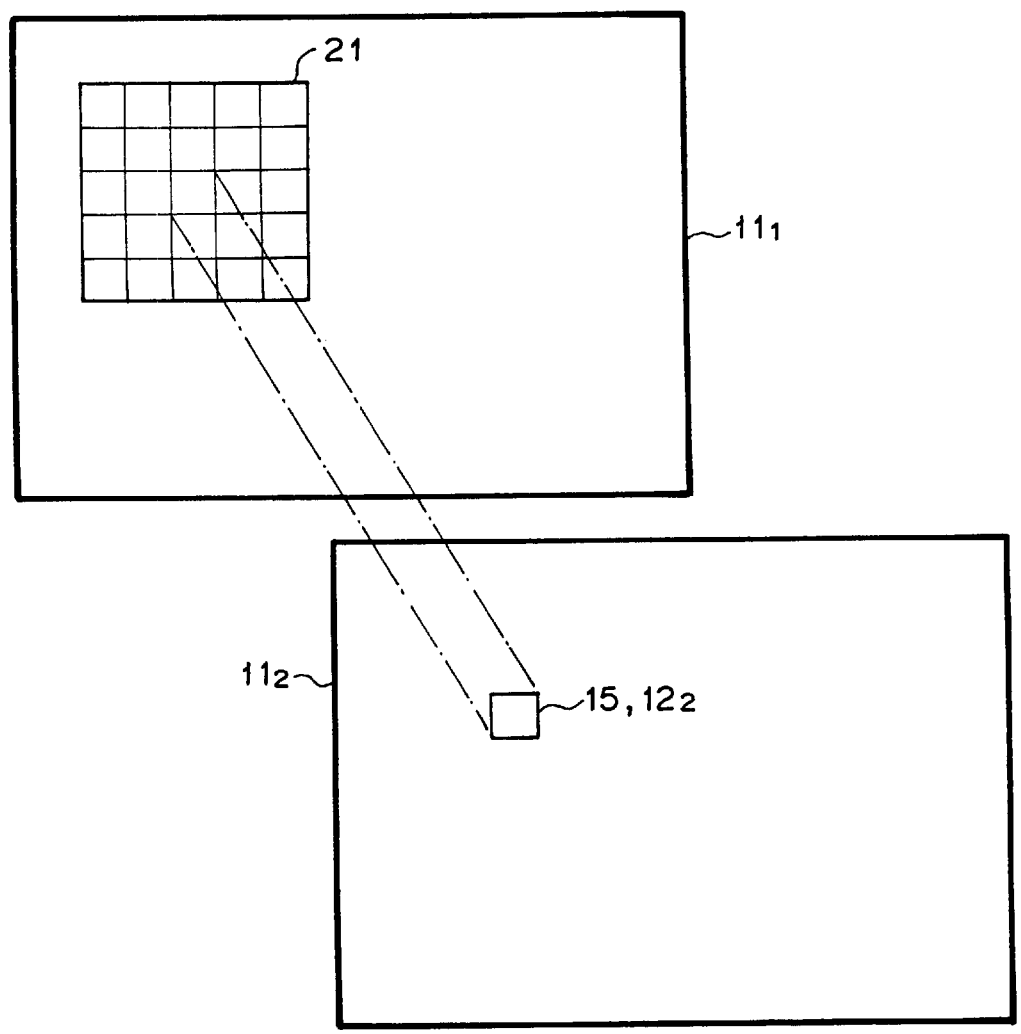
FIG. 14 is an explanatory diagram showing the principle of detection of a motion vector between frames.

FIG. 2 corresponds to FIG. 14 and shows the principle of detecting a motion vector in the present embodiment. In FIG. 2, a macro block $12_C$ represents a position of a macro block (hereafter referred to as motion vector detection macro block) to be now subjected to processing in a frame $11_C$ in which a motion vector should be now detected (hereafter referred to as motion vector detection frame). For detecting a motion vector of the motion vector detection macro block $12_C$, an immediately preceding frame or a frame preceding the motion vector detection frame by a predetermined number of frames is referred to. This frame is referred to as a reference frame $11_R$. Furthermore, a retrieval range in the reference frame $11_R$ corresponding to the motion vector detection macro block $12_C$ is referred to as a retrieval range $21_C$.

In the first embodiment, the retrieval range $21_C$ has the following characters.

(a) The center position of the retrieval range $21_C$ in the reference frame $11_R$ corresponds to position to the position of the motion vector detection macro block $12_C$ in the motion vector detection frame $11_C$. In other words, if the reference frame $11_R$ is supposed to be superimposed on the motion vector detection frame $11_C$, the position of the motion vector detection macro block $12_C$ coincides with the central position 111 (represented by shading in FIG. 2) of the retrieval range $21_C$.

(b) The retrieval range $21_C$ is a square shaped region having a size of M pixels by M pixels (where M is an integer greater than the number of pixels of one side forming the macro block). However, if the retrieval range $21_C$ does not have a size which covers such a range that a motion of the image between the reference frame $11_R$ and the motion vector detection frame $11_C$, if any, can be detected, then it becomes impossible to detect the motion vector between the two frames $11_R$ and $11_C$.

Figure 15:
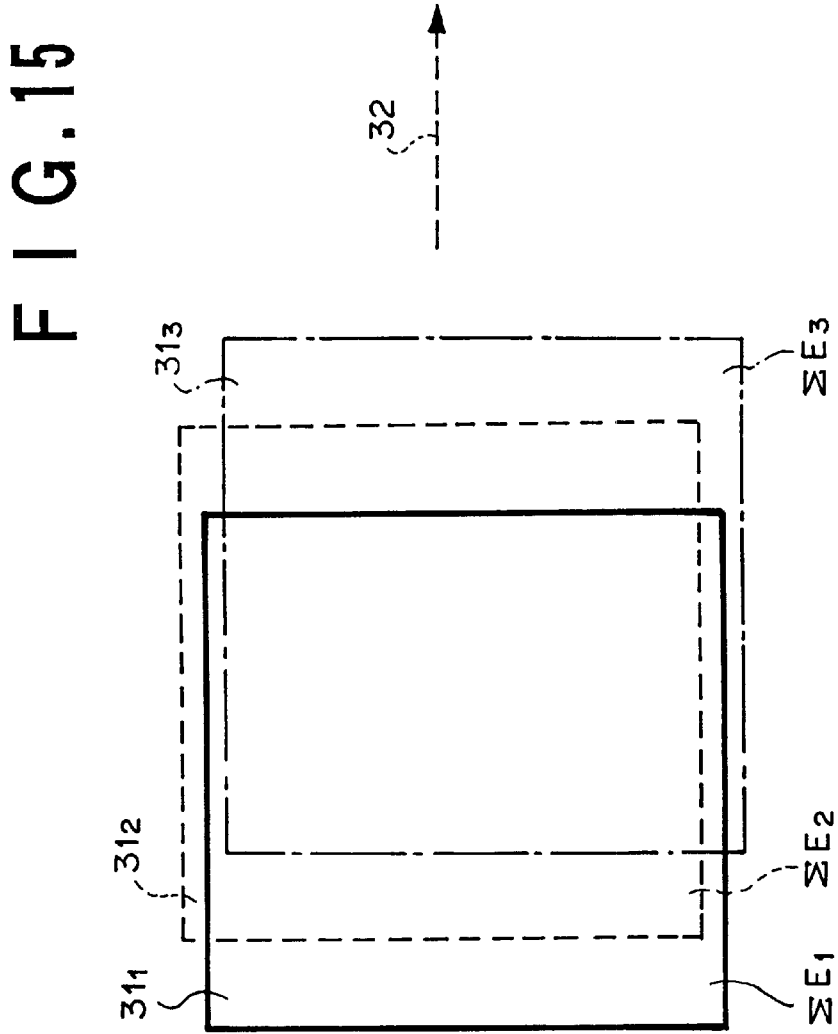
FIG. 15 is an explanatory diagram showing how to derive a vector evaluation value while moving an inspection framework.

In general, the retrieval range $21_C$ need not always be a square region. In the present embodiment, however, retrieval is conducted while rotating the inspection framework 31 shown in FIG. 15 in a spiral form as indicated by an arrow of FIG. 2 from the central position 111 of the retrieval range $21_C$. As a result, therefore, the retrieval range $21_C$ becomes a square shaped region. In the case where the inspection framework 31 exhibits a movement form similar to the raster scan as shown in FIG. 15, the retrieval range $21_C$ may be a rectangular region other than a square, or a region having an arbitrary shape other than the rectangular shape.

FIG. 3 shows a part of a movement of the inspection framework in the present embodiment. The inspection framework 31 is set to the central position 111 of the retrieval range $21_C$. Computation processing of the vector evaluation processing is conducted. Thereafter, the inspection framework 31 is moved upward in FIG. 3 by one pixel as indicated by an arrow denoted by a character 1 in FIG. 3. In this state, computation processing of the next vector evaluation value is conducted. Subsequently, the inspection framework 31 is moved rightward in FIG. 3 by one pixel as indicated by an arrow denoted by a character 2 in FIG. 3. In this state, computation processing of the next vector evaluation value is conducted. Thereafter, the inspection framework 31 is moved downward in FIG. 3 by one pixel as indicated by an arrow denoted by a character 3 in FIG. 3. In this state, computation processing of the next vector evaluation value is conducted. Although not illustrated thereafter, the inspection framework 31 is moved further downward by one pixel. In this state, computation processing of the next vector evaluation value is conducted. Then the inspection framework 31 is moved leftward by one pixel. In this state, computation processing of the next vector evaluation value is conducted. Thereafter, computation of the vector evaluation value is conducted, while the inspection framework 31 is moved outward in the spiral form in the same way.

In the present embodiment, a fixed detection threshold value is set on the basis of the motion vector detection macro block $12_C$ in the motion vector detection frame $11_C$, when computing the vector evaluation value in the retrieval range $21_C$ shown in FIG. 3. The fixed detection threshold value is a concept resembling the minimum accumulation value described with reference to FIG. 16, but differs from the minimum accumulation value in the following points.

Figure 16:
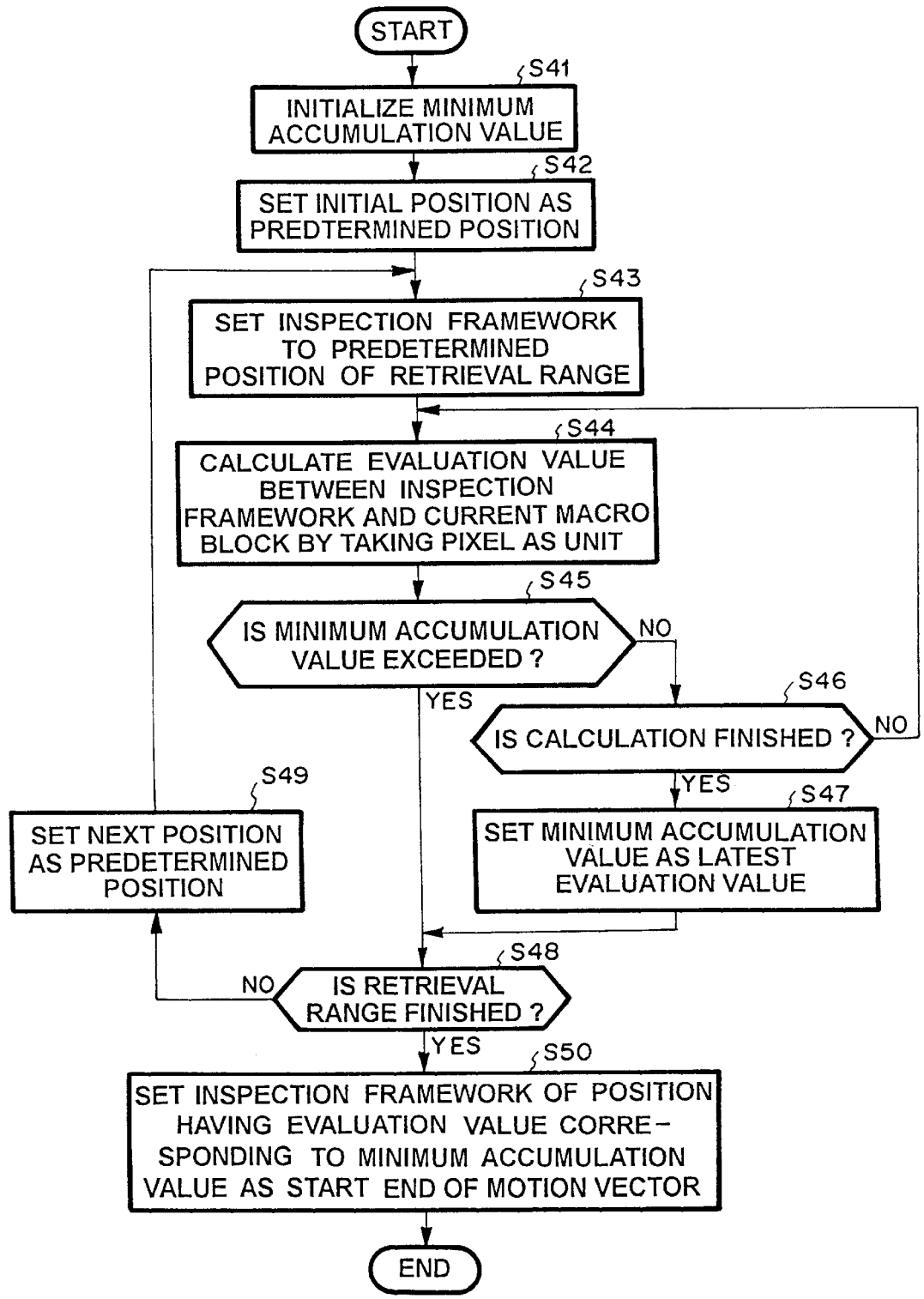
FIG. 16 is a flowchart showing motion vector detection processing operation using accumulation addition cease means proposed in the prior art.

The minimum accumulation value described with reference to FIG. 16 coincides with the minimum value of the vector evaluation value in the retrieval range $21_C$. However, the fixed detection threshold value of the present embodiment is a minimum value in the vector evaluation values derived with respect to adjacent macro blocks. In some cases, therefore, the fixed detection threshold value coincides with the minimum value of the vector evaluation value in the retrieval range $21_C$. However, there is a possibility that a vector evaluation value less than this exists.

Figure 4:
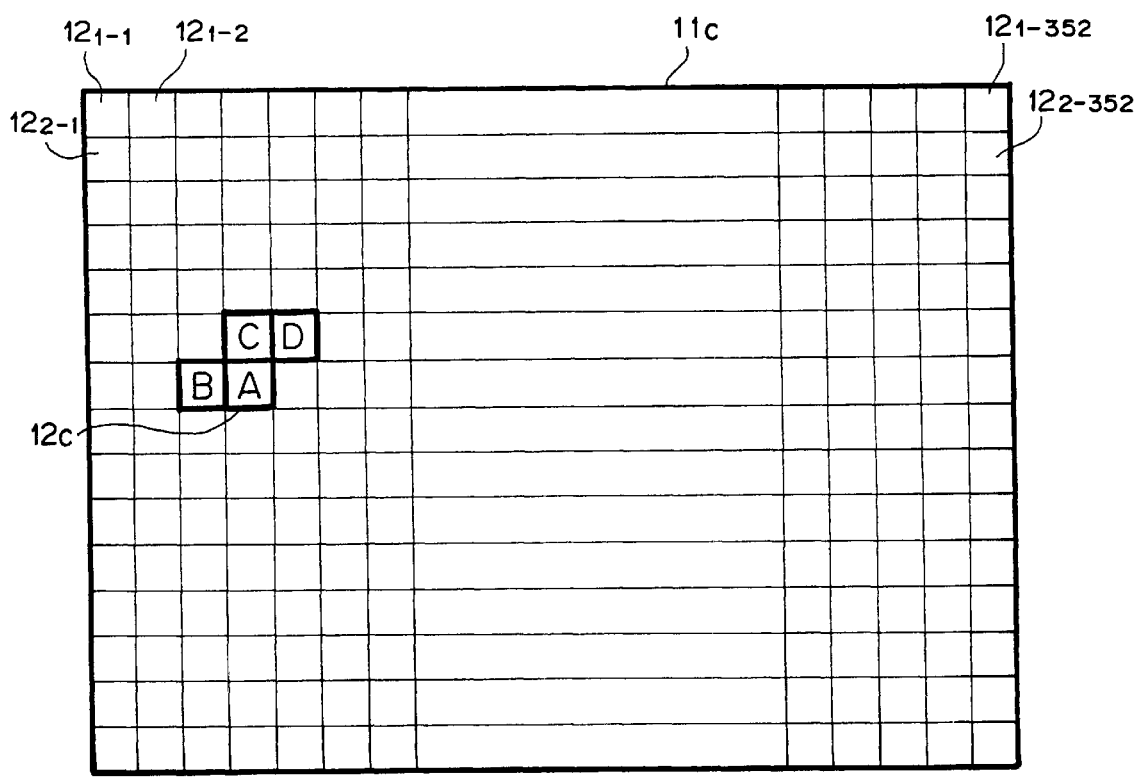
FIG. 4 is a plan view of a frame showing how to determine a fixed detection threshold value in effecting computation of vector evaluation values.

FIG. 4 shows a method for determining the fixed detection threshold value when conducting the computation of the vector evaluation value. The position of the motion vector macro block $12_C$ in the motion vector detection frame $11_C$ is denoted by a character "A." In the motion vector detection frame $11_C$, a motion vector is first derived with respect to a macro block $12_{1-1}$ located in the top leftmost part of FIG. 4. Subsequently, a motion vector is derived with respect to a macro block $12_{1-2}$ obtained by moving the macro block $12_{1-1}$ rightward by one block in FIG. 4. Thereafter, the macro block is moved rightward by one block at a time in the same way. With respect to a macro block $12_{1-352}$ located in the top rightmost position shown in FIG. 4, a motion vector is derived. The numeral "352" is a numeral based on the fact that one line of one frame is formed of 352 pixels.

If the motion vectors corresponding to one line are thus obtained, then a motion vector with respect to a macro block $12_{2-1}$ located in a position which is one line below the top leftmost part of FIG. 4 is derived. Thereafter, motion vectors are derived while the macro block is moved by one block at a time. If a motion vector is obtained with respect to a macro block $12_{2-352}$ located in the rightmost position of the second line, then the processing returns to the left end again, and a motion vector is derived with respect to a macro block $12_{3-1}$ located one line below. Thereafter, motion vectors are derived in the same way. Finally, a motion vector is derived with respect to a macro block $12_{240-352}$ in the bottom rightmost position in FIG. 4 showing the motion vector detection frame $11_C$. Processing of this frame is finished.

In a stage for deriving a motion vector of the motion vector detection macro block $12_C$ located in the position denoted by the character "A" in FIG. 4, therefore, motion vectors are already derived with respect to parts of macro blocks adjacent to the motion vector detection macro block $12_C$. Among the macro blocks calculated as to motion vector, a minimum value among vector evaluation values of three positions denoted by characters "B," "C," and "D" in FIG. 4 is set as the fixed detection threshold value. The position denoted by the character "B" is located on the same line as the motion vector detection macro block $12_C$ and to the left side of the motion vector detection macro block $12_C$ so as to be adjacent thereto in FIG. 4. It is considered that the position denoted by the character "B" has very high correlation in image information with the motion vector detection macro block $12_C$. The position denoted by the character "C" is located above the motion vector detection macro block $12_C$ so as to be adjacent thereto in FIG. 4. In the same way, it is considered that the position denoted by the character "C" has very high correlation in image information with the motion vector detection macro block $12_C$. The position denoted by the character "D" is diagonally to the upper right of the motion vector detection macro block $12_C$ so as to be adjacent thereto in FIG. 4. In the same way, the position denoted by the character "D" has very high correlation. In addition, the macro block in this position has high correlation with a macro block which is located on the same line as the motion vector detection macro block $12_C$ and to the right of the motion vector detection macro block $12_C$ so as to be adjacent thereto in FIG. 4 and which is not computed yet. As a result, it can be considered that the macro block in the position "D" contains information of the macro block located to the right side of the motion vector detection macro block $12_C$ so as to be adjacent thereto.

In the present embodiment, vector evaluation values of the macro blocks in three positions denoted by the characters "B," "C" and "D" are picked up, and a minimum value of them is set as the fixed detection threshold value, for the above described reason. It is not always necessary to select a minimum value out of three vector evaluation values. In the present embodiment, however, a motion vector is detected while judging the fixed detection threshold value to be the minimum vector evaluation value of the motion vector detection macro block $12_C$. If a maximum value is selected out of three vector evaluation values, therefore, the detection precision of the motion vector lowers by the amount of loosened detection.

Figure 5:
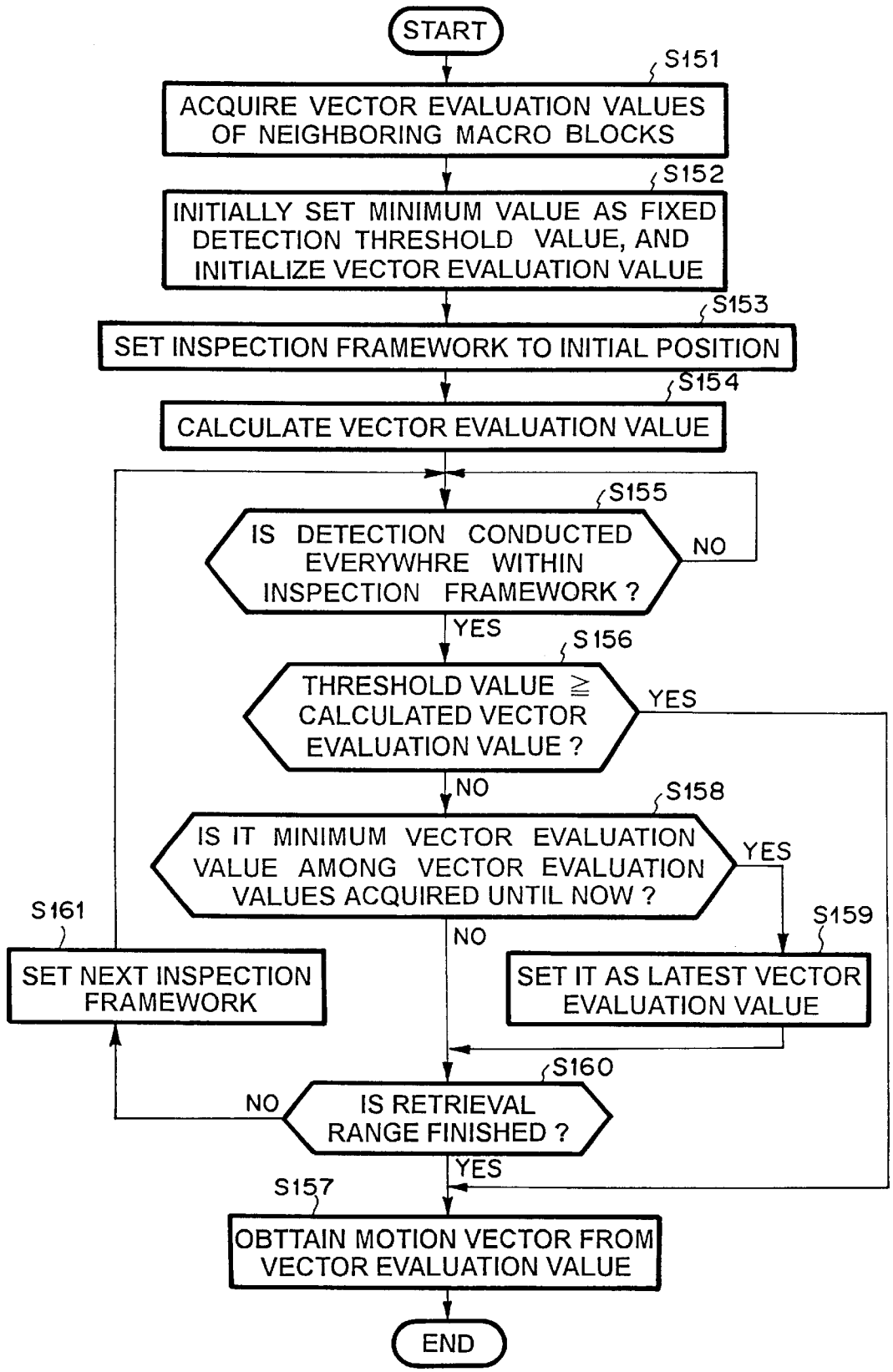
FIG. 5 is a flowchart showing the flow of motion vector detection processing according to the present embodiment.

FIG. 5 shows the flow of the motion vector detection processing in the present embodiment. The CPU 101 shown in FIG. 1 first acquires vector evaluation values of macro blocks located around the motion vector detection macro block $12_C$ (step S151). In this example, the vector evaluation values of the macro blocks in three positions denoted by the characters "B," "C" and "D" are picked up. Subsequently, a minimum value is selected out of these values, and this is initially set as the fixed detection threshold value. Furthermore, the initial value of the vector evaluation value obtained in the inspection range is set to a maximum value which can be assumed (step S152). Thereafter, the inspection framework 31 (see FIG. 3) is set to its initial position (step S153). In the present embodiment, the inspection framework 31 is set to the central position 111 of the retrieval range $21_C$. And calculation of a vector evaluation value is conducted (step S154). To be concrete, absolute values of signal level differences between pixels of the inspection framework 31 having the same size as that of the macro block and corresponding pixels of the motion vector detection macro block $12_C$ are respectively derived, and the results are added in the order in which they are obtained. In this example, absolute values of signal level differences between pixels are successively derived with respect to a macro block having 16 by 16 pixels, and the accumulation sum of them is calculated (step S155). In the computation with respect to the first pixel, merely only the absolute value of the difference is derived.

If a vector evaluation value for the same inspection framework 31 is obtained (Y of step S155), then the vector evaluation value is compared with the fixed detection threshold value to determine which is greater (step S156). If as a result the calculated vector evaluation value is equal to or less than the fixed detection threshold value (Y of step S156), then a motion vector is obtained immediately from the vector evaluation value without continuing the work of moving the inspection framework 31 to a remaining region in the retrieval range $21_C$ and deriving a vector evaluation value (step S157), and the processing is finished. In other words, the processing time for obtaining the vector evaluation value is shortened thereby.

On the other hand, if the vector evaluation value derived with respect to currently set inspection framework 31 is greater than the fixed detection threshold value (N of step S156), then there is a possibility that an inspection framework 31 having a vector evaluation value equal to or less than the fixed detection threshold value exists in the retrieval range $21_C$ and there is a possibility that such an inspection framework 31 does not exist in the retrieval range $21_C$. In the latter case, it is necessary to find a minimum value among values greater than the fixed detection threshold value and obtain a motion vector by using the inspection framework 31. It is determined whether the currently obtained vector evaluation value is minimum among the vector evaluation values obtained until now (step S158). If it is a minimum value (Y), it is stored in a predetermined region of the RAM 103 shown in FIG. 1 as a latest vector evaluation value (step S159). In other words, the latest vector evaluation value currently obtained is overwritten on the vector evaluation value which has been stored in this region.

In the case where the vector evaluation value is equal to or greater than the minimum value of the vector evaluation value acquired until now at step S158 (N), or after the latest vector evaluation value is stored at step S159, it is determined whether retrieval has been conducted everywhere in the retrieval range $21_C$ (step S160). If there is a place where the inspection framework 31 is not yet set in the retrieval range $21_C$ (N), then the inspection framework 31 is set to the next position as described with reference to FIG. 3 in order to derive the next vector evaluation value (step S161). And the processing returns to the step S155, where the accumulation sum is calculated with respect to the inspection framework 31, and the vector evaluation value is derived. The vector evaluation value thus derived is compared with the fixed detection threshold value (step S156).

If, in the process of setting the inspection framework 31 in every region in the retrieval range $21_C$ and deriving a vector evaluation value, an inspection framework 31 having a vector evaluation value equal to or less than the fixed detection threshold value can be detected (Y of step S156), then the processing of deriving the vector evaluation value is finished at that time point and the motion vector is derived, as already described. On the other hand, if a vector evaluation value equal to or less than the fixed detection threshold value cannot be obtained although the inspection framework 31 is set in every region in the retrieval range $21_C$ (Y of step S160), a motion vector is obtained by setting the minimum value of the vector evaluation value obtained in the retrieval range $21_C$ as the vector evaluation value of the macro block (step S157).

(Modification of First Embodiment)

In the first embodiment heretofore described, a range wider than the macro block size having a position which is the same as the position of the motion vector detection macro block $12_C$ in the motion vector detection frame $11_C$ as a center thereof is set as the retrieval range $21_C$. If the position of the retrieval range $21_C$ is thus fixed, however, then efficient detection can be conducted with respect to an image portion which is small in motion between frames, whereas in an image portion having a large motion a detection place exists near the framework of the retrieval range $21_C$ or a detection place exists outside the framework of the detection range $21_C$ in the worst case. Such a case must be coped with by further widening the detection range $21_C$ at the time of detection. In an image portion having a large motion, therefore, it takes a long time to detect a motion vector, and motion vector detection processing cannot be conducted efficiently in some cases. In this modification, therefore, the motion quantity and motion direction of the same image portion as the motion vector detection macro block $12_C$ in the motion vector detection frame $11_C$ is predicted by referring to the past motion vector of the image portion. Centering around the position, a retrieval range $21_E$ is predicted and set. In addition, with a central position $111_E$ as the start point, the inspection framework 31 is moved in a spiral form and a motion vector is detected.

Figure 6:
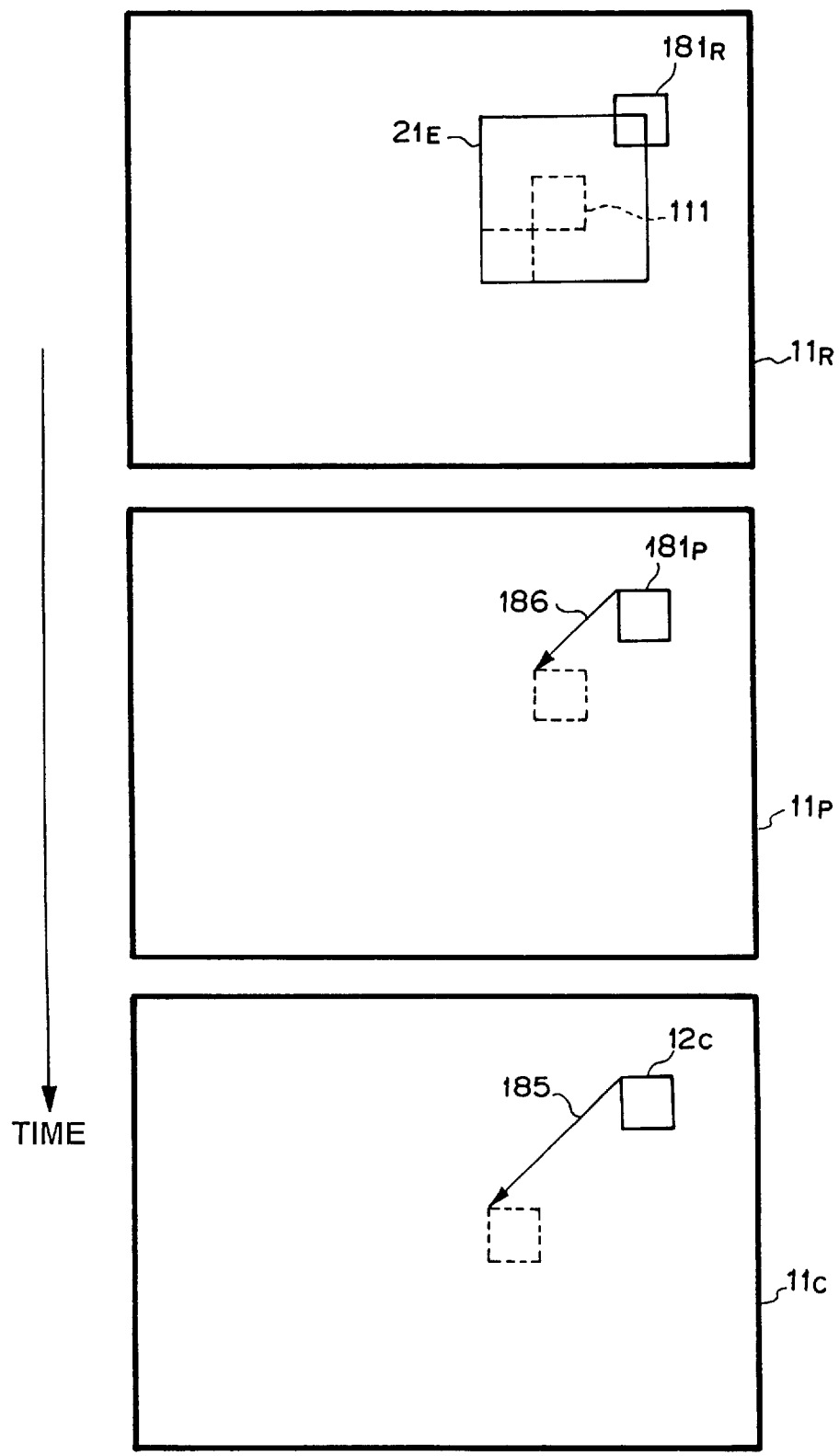
FIG. 6 is an explanatory diagram showing an example of movement of a specific image portion in a frame when attention is paid to the specific image portion in a modification of the first embodiment.

FIG. 6 shows an example of movement of a specific image portion in a frame when attention is paid to the specific image portion. For brevity of the description, a frame which is one frame before the motion vector detection frame $11_C$ (a frame subjected to image processing temporally one frame before a frame under processing among a plurality of frames to be consecutively processed) is referred to as a past frame $11_P$. A frame which is further one frame before the past frame $11_P$ is referred to as a reference frame $11_R$. It is now assumed that retrieval of a motion vector of a macro block $181_P$ in the past frame $11_P$ is conducted centering around a macro block $181_R$ in the reference frame $11_R$ which exists in the same position as the macro block $181_P$, and consequently a motion vector indicated by an arrow 186 is acquired. In other words, an image portion 111 having the same size as that of the macro block in the reference frame $11_R$ has moved to the position of the macro block $181_P$ in the past frame $11_P$.

When retrieving a motion vector, both the motion vector detection frame $11_C$ and the past frame $11_P$ refer to the reference frame $11_R$. Therefore, it is evident that a motion vector in the motion vector detection frame $11_C$ and a motion vector in the past frame $11_P$ have an intense correlation relation. In other words, the motion detection macro block $12_C$ in the motion vector detection frame $11_C$ has an intense correlation relation with the motion vector 186 in the macro block $181_P$ in the past frame $11_P$ existing in the same position. In this modification, therefore, the motion vector 186 derived between the past frame $11_P$ and the reference frame $11_R$ is used as a prediction vector, and a position of the motion vector detection macro block $12_C$ of two frames before is presumed. Centering around this position, the retrieval range $21_E$ is set on the reference frame $11_R$.

Supposing that two motion vectors 185 and 186 for the reference frame $11^R$ have the same direction and magnitude, the central position 111 of the retrieval range $21_E$ coincides with the motion detection macro block $12_C$ by using the motion vector in the past frame $11_P$ as the prediction vector of the motion detection frame. Even if the motion vector 186 slightly differs from the motion vector 185 in direction and magnitude, detection in the retrieval range $21_E$ becomes sufficiently possible because both of them have intense correlation. In other words, the direction and magnitude of the motion vector of the motion detection macro block $12_C$ can be predicted by using the prediction vector. Without expanding the magnitude of the retrieval range $21_E$ unreasonably, the motion vector 185 can be detected efficiently in an extremely short time from the retrieval start.

Figure 7:
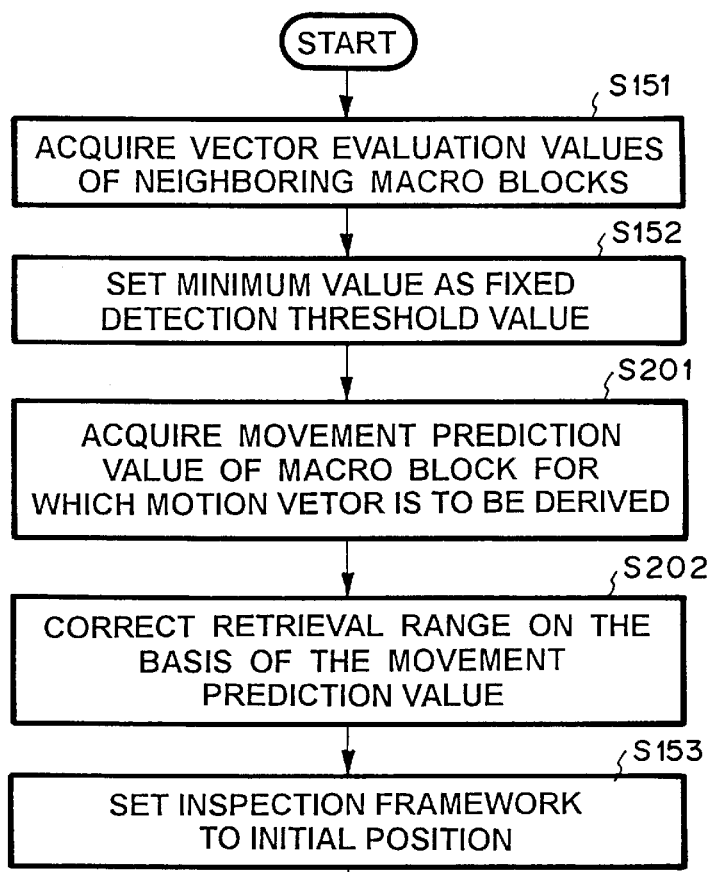
FIG. 7 is a flowchart showing the flow of motion vector detection processing in the modification.

FIG. 7 shows the flow of the motion vector detection processing in this modification. In FIG. 7, however, the same components as those of FIG. 5 of the prior embodiment are denoted by like characters, and description of these components is omitted appropriately. In this modification, vector evaluation values of macro blocks located around the vector detection macro block $12_C$ are first acquired (step S151). As described earlier, vector evaluation values of macro blocks in three positions denoted by the characters "B," "C," and "D" are picked up. Subsequently, a minimum value is selected out of these values and set as the fixed detection threshold value (step S152).

Thereafter, the movement direction and movement quantity of the motion vector detection macro block $12_C$ are predicted on the basis of past motion vector (step S201). As for this, processing described with reference to FIG. 6 is conducted separately, and the motion vector of the past frame is used as the prediction vector. On the basis of this prediction vector, the retrieval range $21_C$ set in the embodiment is corrected to become the retrieval range $21_E$ (step S202). To be concrete, the retrieval range $21_C$ on the reference frame $11^R$ is moved in the same direction as that of the prediction vector and by the same magnitude as that of the prediction vector, and a new retrieval range $21_E$ is set. And the inspection framework 31 (see FIG. 3) is set to the initial position (step S153). Thereafter, operation is the same as that of the prior embodiment.

In the modification of the first embodiment, the retrieval range is thus predicted and moved according to the motion of the image. In addition, the inspection framework 31 is moved around the prediction position toward the neighborhood successively in the spiral form, and the motion vector detection operation is conducted. Therefore, it is possible to detect the motion vector efficiently in a limited range without setting the retrieval range $21_C$ to a wide range.

(Second Embodiment)

Figure 8:
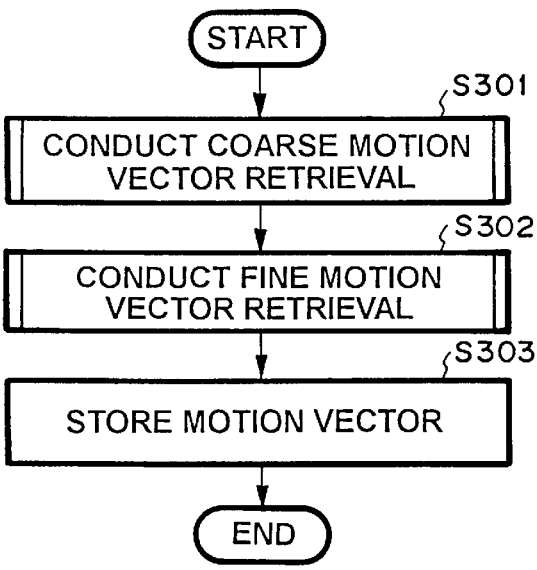
FIG. 8 is a flowchart showing the outline of motion vector detection operation of a motion detection apparatus in a second embodiment of the present invention.
Figure 13:
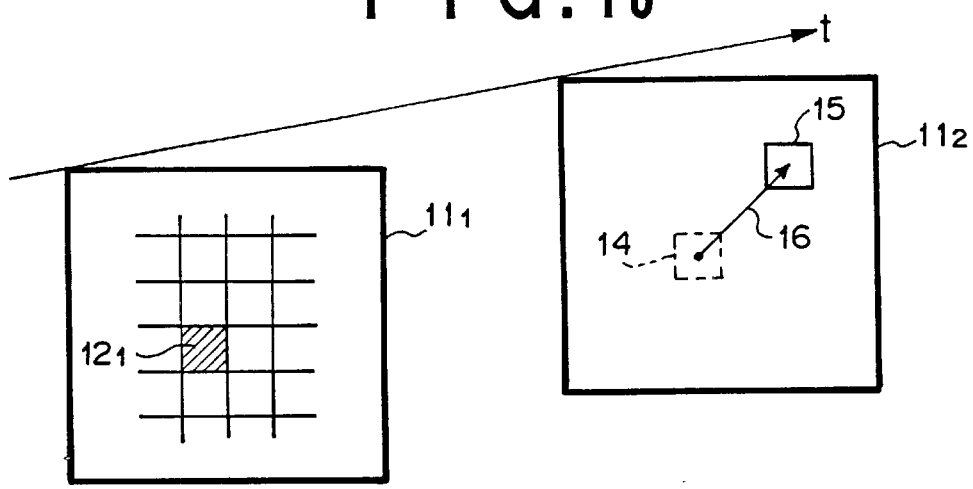
FIG. 13 is an explanatory diagram showing the concept of a motion vector.

FIG. 8 shows the outline of motion vector detection operation of the motion vector detection apparatus in a second embodiment of the present invention. Since the basic configuration of the motion vector detection apparatus in the second embodiment is the same as that of the first embodiment shown in FIG. 1, its illustration and description will be omitted. As for the drawings which have been used in the first embodiment and which can be used for description as they are, they are used in the description.

In the second embodiment, coarse motion vector retrieval is first conducted in the retrieval range set on the reference frame $11^R$ (step S301). The term "coarse motion vector retrieval" refers to moving the inspection framework 31 with a coarse pitch such as two pixels or five pixels, instead of moving the inspection framework 31 by taking one pixel as the unit as described earlier with reference to FIG. 15 or FIG. 3. The size of the inspection framework 31 in this case does not differ from that in the case where the ordinary vector evaluation value is derived.

If respective vector evaluation values are derived by this coarse motion vector retrieval, then the rough start point of the motion vector with respect to the motion vector detection macro block $12_C$ can be derived. In order to find an accurate start point of a vector in the rough start point, the motion vector detection apparatus of the present embodiment executes fine motion vector retrieval (step S302). And if the motion vector for the motion vector detection macro block $12_C$ is finally found, it is stored in a predetermined region of the RAM 103 of FIG. 1 or a corresponding region of the storage device 104 (step S303) and the processing is finished.

FIGS. 9 and 10 show a concrete flow of the coarse motion vector retrieval processing of the step S301. The CPU 101 shown in FIG. 1 first acquires vector evaluation values of macro blocks located around the motion vector detection macro block $12_C$ (step S321). In this example, vector evaluation values of macro blocks in three positions denoted by the characters "B," "C," and "D" are picked up in the same way as the first embodiment. Subsequently, a minimum value is selected out of these values and set initially as the fixed detection threshold value. In addition, the initial value of the vector evaluation value obtained in the inspection range is set to a maximum value which can be assumed (step S322). Thereafter, the inspection framework 31 (see FIG. 3) is set to its initial position (step S323). In the present embodiment, the inspection framework 31 is set to the central position 111 of the retrieval range $21_C$. And absolute values of signal level differences between pixels of the inspection framework 31 having the same size as that of the macro block and corresponding pixels of the motion vector detection macro block $12_C$ are respectively derived, and the results are added in the order in which they are obtained to calculate a vector evaluation value (step S324). To be concrete, absolute values of signal level differences between pixels of the inspection framework 31 having the same size as that of the macro block and corresponding pixels of the motion vector detection macro block $12_C$ are respectively derived, and the results are added accumulatively in the order in which they are obtained. In this example, absolute values of signal level differences between pixels are successively derived with respect to a macro block having 16 by 16 pixels, and the accumulation sum of them is calculated (step S325). In the computation with respect to the first pixel, merely only the absolute value of the difference is derived.

If a vector evaluation value for the inspection framework 31 is obtained (Y of step S325), then the vector evaluation value is compared with the fixed detection threshold value to determine which is greater (step S326). If as a result the calculated vector evaluation value is equal to or less than the fixed detection threshold value (Y of step S326), then a tentative motion vector is obtained immediately from the vector evaluation value by coarse motion vector detection processing, without continuing the work of moving the inspection framework 31 to a remaining region in the retrieval range $21_C$ and deriving a vector evaluation value (step S327 of FIG. 10). The neighborhood of the start point of the tentative motion vector is set as the retrieval range of the fine motion vector retrieval processing (step S328). The coarse motion vector retrieval processing is thus finished (END).

On the other hand, if the vector evaluation value derived with respect to currently set inspection framework 31 is greater than the fixed detection threshold value (N of step S326), then there is a possibility that an inspection framework 31 having a vector evaluation value equal to or less than the fixed detection threshold value exists in the retrieval range $21_C$ and there is a possibility that such an inspection framework 31 does not exist in the retrieval range $21_C$. In the latter case, it is necessary to find a minimum value among vector evaluation values greater than the fixed detection threshold value and obtain a motion vector from the minimum value. It is determined whether the currently obtained vector evaluation value is minimum among the vector evaluation values obtained until now (step S329). If it is a minimum value (Y), it is stored in a predetermined region of the RAM 103 shown in FIG. 1 as a latest vector evaluation value (step S330). In other words, the latest vector evaluation value currently obtained is overwritten on the vector evaluation value which has been stored in this region.

In the case where the vector evaluation value is equal to or greater than the minimum value of the vector evaluation value acquired until now at step S329 (N), or after the latest vector evaluation value is stored at step S330, it is determined whether retrieval has been conducted everywhere in the retrieval range $21_C$ (step S331). If there is a place where the inspection framework 31 is not yet set in the retrieval range $21_C$ (N), then the inspection framework 31 is set to the next position as described with reference to FIG. 3 in order to derive the next vector evaluation value (step S332). And the processing returns to the step S325, where the accumulation sum is calculated with respect to the inspection framework 31, and the vector evaluation value is derived. The vector evaluation value thus derived is compared with the fixed detection threshold value (step S326).

If, before setting the inspection framework 31 in every region in the retrieval range $21_C$ and deriving a vector evaluation value, an inspection framework 31 having a vector evaluation value equal to or less than the fixed detection threshold value can be detected (Y of step S326), then the processing of deriving the vector evaluation value is finished at that time point and the motion vector is derived, as already described. On the other hand, if a vector evaluation value equal to or less than the fixed detection threshold value cannot be obtained although the inspection framework 31 is set in every region in the retrieval range $21_C$ (Y of step S331), a tentative motion vector is obtained by setting the minimum value of the vector evaluation value obtained until then, as the vector evaluation value of the macro block (step S327). The neighborhood of the start point of the tentative motion vector is set as the retrieval range of the motion vector retrieval processing (step S328). The coarse motion vector retrieval processing is thus finished (END).

FIG. 11 shows the concrete flow of fine motion vector retrieval processing described with reference to the step S302. In this processing, the inspection framework 31 (see FIG. 3) is set to the initial position (step S351). The initial position is the central position in a narrowed retrieval range for the fine motion vector retrieval processing at the previous step S331. In the fine motion vector retrieval processing as well, a minimum value of the vector evaluation value obtained from macro blocks located around a macro block subjected to motion vector retrieval is set as the fixed detection threshold value. As for this, the same value as that in the case of the coarse motion vector retrieval processing is used. Therefore, processing for newly acquiring a fixed detection threshold value is not needed.

Thereafter, the operation is the same as the step S324 of FIG. 9. Therefore, description thereof will be omitted. In the case of the processing of FIG. 11, however, processing is finished in such a stage that a motion vector is obtained on the basis of a final vector evaluation value at the step S327 (END).

In the embodiments and modifications heretofore described, the vector evaluation value obtained by adding the absolute values of signal level differences between corresponding pixels of macro blocks is used to derive the motion vector. However, the vector evaluation value is not limited to this.

Furthermore, in the embodiments and modifications, the inspection framework serving as a region for effecting computation of the vector evaluation value is moved from the central position of the retrieval range to the outside in the spiral form. However, the order of movement of the inspection framework in the retrieval range is not limited to this. As a matter of course, various schemes can be adopted. For example, it is also possible to move the inspection framework as in the raster scan of TV.

Furthermore, in the second embodiment, the vector evaluation value of macro blocks in the neighborhood is used as the fixed detection threshold value which is initially set, in both the coarse vector retrieval and fine vector retrieval. However, it is also possible to use such a value in either of these retrievals. Furthermore, in the second embodiment, coarse motion vector retrieval processing is conducted and thereafter fine motion vector retrieval processing is executed. Without conducting such processing of two stages, however, it is also possible according to circumstances to detect a motion vector unconditionally from the result of coarse motion vector retrieval processing. For example, in the case where the processing capability of the computer is comparatively low and in the case where the processing capability is limited because of the relation to other processing, processing meeting the use environment can be implemented by directly effecting the motion vector detection from the result of the coarse motion vector retrieval processing.

What is claimed is:

1. A motion vector detection apparatus wherein a macro block most similar to an object macro block in a frame under image processing is detected in a retrieval range prescribed in a reference frame which is close in time to the frame under image processing, which comprises:

vector evaluation value calculation means for setting one of two frames representing a dynamic image which are close in time to each other as a reference frame, setting the other of the two frames as a frame under image processing, associating pixels forming arbitrary one macro block among macro blocks obtained by dividing the frame under image processing into a plurality of regions with pixels forming an inspection framework existing in the reference frame and having the same size as that of the macro block, in one-to-one correspondence, and calculating a vector evaluation value from a result obtained by accumulating signal level difference values of the pixels;

retrieval range setting means for setting a retrieval range, in response to a position of a macro block included in the frame under processing and to be calculated by the vector evaluation value calculation means, a position in which the same image portion as the macro block exists is retrieved in the retrieval range by using the inspection framework;

inspection framework moving means for moving the inspection framework to a next new position within the retrieval range set by the retrieval range setting means and causing a vector evaluation value to be calculated for the new position, whenever the vector evaluation value calculation means finishes the vector evaluation value calculation operation in response to one inspection frame;

motion vector detection means for deriving a motion vector represented as a vector linking an inspection framework having a minimum vector evaluation value to the macro block included in the frame under processing and to be calculated by the vector evaluation value calculation means, when all movements of the inspection framework in the retrieval range caused by the inspection framework moving means have been finished;

macro block specifying means for specifying a macro block in order to detect a motion vector, so long as there is at least one macro block in the frame under processing for which a motion vector has not been detected, whenever the motion vector detection means detects a motion vector for a macro block in the frame under processing;

fixed detection threshold value setting means for setting a fixed detection threshold value serving as a value for fixing motion vector detection, based on already derived vector evaluation values, if any, among vector evaluation values of a predetermined number of macro blocks located in the same frame under processing near and having specific position relations to a macro block specified by the macro block specifying means; and motion vector detection decision means for comparing a vector evaluation value obtained whenever the inspection framework is moved within the retrieval range by the inspection framework moving means with the fixed detection threshold value set by the fixed detection threshold value setting means, and responding to emergence of an inspection framework having a vector evaluation value which is at most the fixed detection threshold value, by judging a motion vector determined by a relation to the inspection framework to be a motion vector finally obtained with respect to the macro block and finishing the movement of the inspection framework with respect to the macro block.

2. The motion vector detection apparatus according to claim 1, wherein said fixed detection threshold value setting means sets a fixed detection threshold value out of vector evaluation values of a predetermined number of macro blocks having specific position relations.

3. The motion vector detection apparatus according to claim 1, wherein said retrieval range setting means comprises prediction means, and when setting a retrieval range for a macro block which is included in the frame under processing and for which the motion vector detection means is to derive a motion vector, the prediction means predicts a position of existence of a pixel portion corresponding to the macro block in the reference frame, by referring to a motion vector of a frame already finished in processing and included in an image portion corresponding to the macro block, and the retrieval range setting means sets a retrieval range in order that the position predicted by the prediction means may become a central position.

4. The motion vector detection apparatus according to claim 1, wherein said inspection framework moving means comprises first inspection framework moving means for moving an inspection framework coarsely in the retrieval range and second inspection framework moving means for moving an inspection framework finely in the retrieval range, the motion vector detection means comprises first motion vector detection means for calculating a tentative motion vector from coarse motion vector retrieval processing based on each of inspection frameworks set by the first inspection framework moving means and second motion vector detection means for calculating a motion vector from fine motion vector retrieval processing based on each of inspection frameworks set by the second inspection framework moving means, and the retrieval range setting means comprises retrieval range limiting means responsive to a tentative motion vector calculated by the first motion vector detection means, for limiting a retrieval range which becomes a subject of the second motion vector detection means to a smaller range based on the tentative motion vector.

5. The motion vector detection apparatus according to claim 1, wherein said inspection framework moving means successively moves an inspection framework from a central portion of the retrieval range to a peripheral part.

6. The motion vector detection apparatus according to claim 4, wherein said said inspection framework moving means further comprises processing simplifying means for setting the judged motion vector as a fixed motion vector without conducting final detection of a motion vector using the second motion vector detection means, when a vector evaluation value of a motion vector judged by the motion vector detection decision means by using the first motion vector detection means is less than the fixed detection threshold value.

* * * * *